Oct. 7, 1941.　　　　　G. TITUS　　　　2,258,038
SCRAPER BOWL
Filed July 27, 1940　　　2 Sheets-Sheet 2
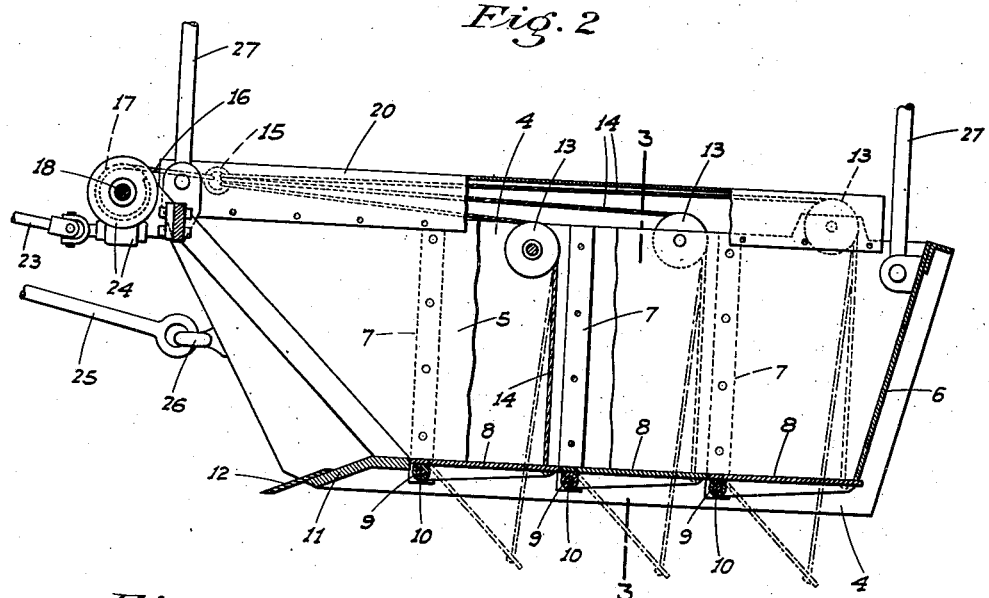
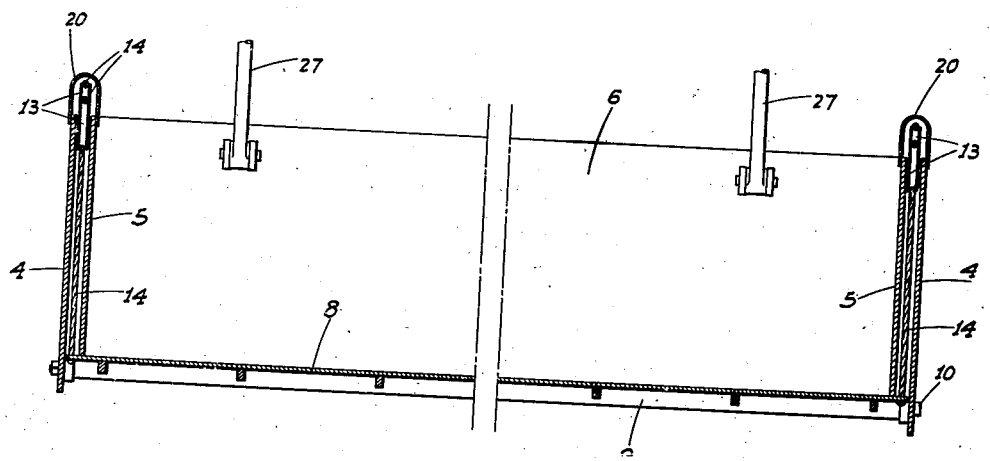
INVENTOR
*Gordon Titus*
BY
ATTORNEYS Patented Oct. 7, 1941

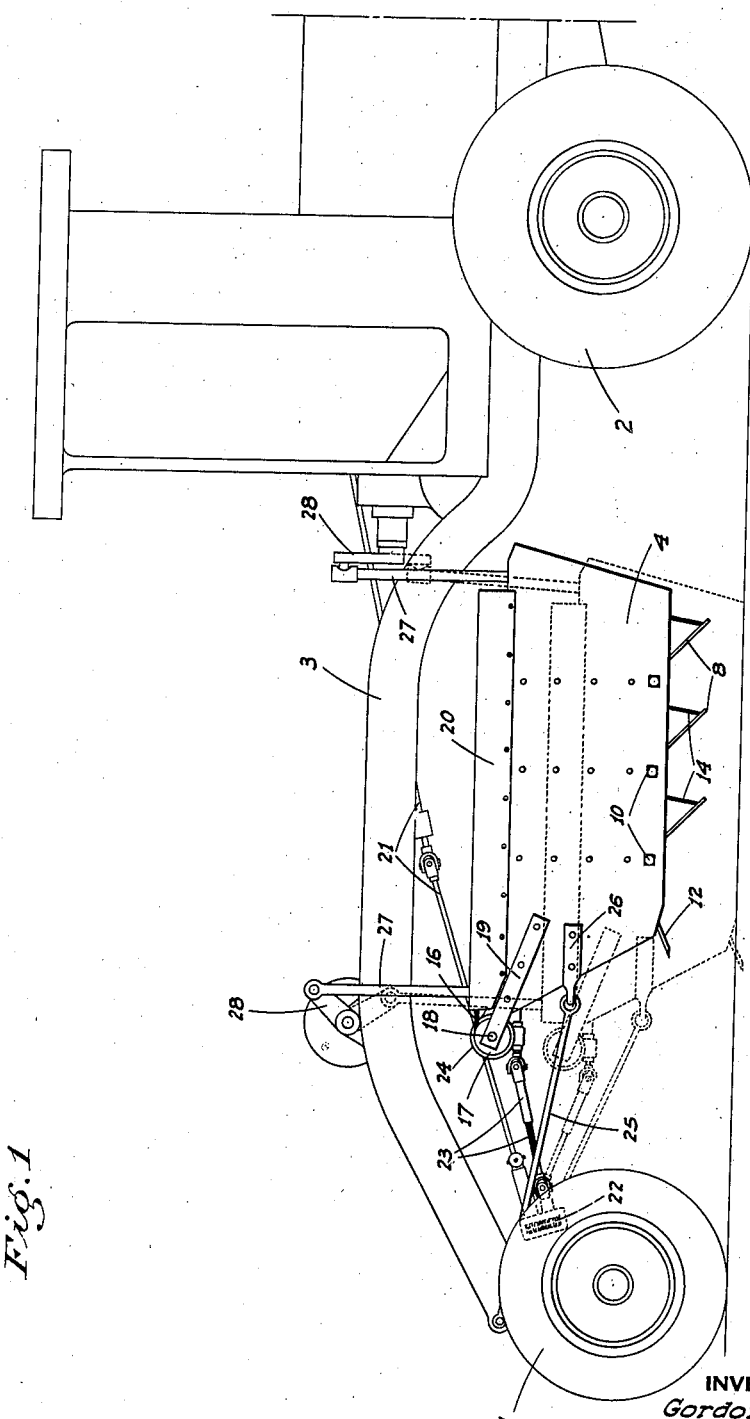

2,258,038

UNITED STATES PATENT OFFICE 2,258,038

SCRAPER BOWL

Gordon Titus, Earlimart, Calif., assignor to Walter A. Clark, Earlimart, Calif.

Application July 27, 1940, Serial No. 347,893

4 Claims. (Cl. 37—126)

This invention relates to scrapers and particularly to a scraper designed to be supported by and operated from that type of self-propelled road maintenance vehicle known as an "auto patrol," which has a long wheel base and a high frame under which the scraper is hung in suspended relation.

The principal object of my invention is to provide a scraper for the purpose so constructed that it may be discharged without tilting, when raised from a scraping position.

Another object is to construct the scraper so that it may carry a considerable load when clear of the ground, and whose load may be discharged almost instantly and in one place, or slowly while the supporting vehicle is moving along.

The scraper, when mounted on such a vehicle, is thus admirably suited for grade leveling, for making cuts as well for cleaning out slides or filling washed out sections on a road, and can be operated in this service with greater effectiveness and time saving than an ordinary scraper on account of the high road speed at which an "auto patrol" may be operated.

However, while the scraper has been particularly designed for attachment to such a vehicle for road work service, it may be made as a complete unit in itself, and used wherever ordinary scrapers are serviceable.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views:

Figure 1 is a side outline of an "auto patrol" showing my improved scraper mounted in connection therewith.

Figure 2 is a sectional elevation, partly broken out, of the scraper detached.

Figure 3 is a transverse section on line 3—3 of Fig. 2.

Referring now more particularly to the characters of reference on the drawings, the "auto patrol" vehicle with which my scraper is designed to be used, comprises front and rear wheels 1 and 2 spaced to provide a long wheel base and connected by a frame 3 arching upwardly between the wheels.

The scraper comprises a wide bowl of rectangular cross section adapted to be disposed under the frame between the front and rear wheels. The bowl includes outer side plates 4, inner side plates 5 spaced from and of somewhat shallower depth than plates 4, and a back plate 6 extending from top to bottom of plates 5 and connecting plates 4 and 5. The adjacent plates 4 and 5 are stiffened at intervals and maintained in spaced relation by uprights 7 therebetween.

The bottom of the bowl comprises a plurality of separate transverse doors 8 extending substantially the full width between plates 4 just under plates 5, said doors being fixed at their forward end on sleeves 9 turnable on rods 10 which form hinge pins for the sleeves as well as tie rods between the bowl plates 4.

The doors when in horizontal alinement form a continuous flat bottom extending forwardly from under the back plate 6 to a termination at a rigid shoe 11 extending between the side plates of the bowl at the front and supporting a downwardly sloping blade 12; the doors at their sides then engaging the bottom edges of plates 5, which limit upward movement of the doors.

Downward tilting of the doors thus provides for the discharge of the bowl at a speed determined by the extent of tilting movement.

The doors are held in closed position, or caused to tilt simultaneously and to the same extent, by the following means: Turnably mounted on the bowl on each side in connection with and between plates 4 and 5 adjacent the rear end of the several doors are pulleys 13, disposed at successively lower levels from the rear forwardly.

Cables 14 are attached to the door adjacent their rear end and extend upwardly and over the corresponding pulleys to a common connection as at 15 with a single cable 16 which passes about and is mounted on a drum-pulley 17. Pulleys 17 on both sides of the bowl are fixed on a common transverse shaft 18 journaled in brackets 19 projecting forwardly from side plates 4. The purpose of staggering pulleys 13 vertically is to enable them to lie in a common vertical longitudinal plane without danger of the cables 14 becoming chafed or entangled with each other. By disposing the pulleys and the cables 14 depending therefrom between the plates 4 and 5, said cables are kept clear of abrasive contact with the dirt in the bowl. The horizontal run of the cables is also enclosed and protected by longitudinal housing 20 bridging and mounted on plates 4 and 5.

Rotation of shaft 18, which controls the winding or unwinding of cables 16 onto or from the drums 17 and the consequent raising and lowering of the doors, may be controlled by the operation of the supporting vehicle irrespective of the level of the bowl relative to frame 3. This is done by the following means: A forwardly projecting rotary operating rod unit 21 mounted on frame 3 is connected at its forward end to a train of gears 22 mounted in fixed connection with the frame between the front wheels 1. A flexible shaft unit 23 is connected at its forward end to one of said gears and at its rear end drives a worm and worm wheel unit, shown conventionally at 24, which is applied to shaft 18. The operating rod unit and gear train are standard equipment on the "auto patrol," though ordinarily used for another purpose.

Tension or pull rods 25 are swivelly connected to ears 26 on the sides of the bowl at the front and on frame 3 at its forward end.

The bowl is suspended from the frame 3 for vertical movement relative thereto by suspension links 27 mounted on the bowl adjacent the front and rear and connected at their upper end on vertically movable and separately operable arms 28 mounted on frame 3, these arms and their control means being also standard equipment on the vehicle.

The depth of the bowl relative to the spacing of the central portion of frame 3 from the ground is such as to allow of an upward movement of the bowl from a digging position which will be ample for unrestricted downward movement of the doors.

It will therefore be seen that the scraper may be lowered, loaded, raised to a load carrying position, and the load then discharged instantly by an unrestricted release and opening of the doors or gradually by a controlled and lesser opening movement of the doors, as the operating conditions may require. It will also be obvious that but little power is needed to open the doors, since the load itself tends to open them.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. A scraper including a bowl having sides each comprising spaced inner and outer plates, a bottom for the bowl including a transverse door, means hinging the door along one edge on the bowl for downward opening movement, said door when closed extending under and engaging the bottom edge of the inner plates and means to control the opening and closing of the door including suspension elements depending between the plates of the two sides and connected to the door in spaced relation to the hinge means.

2. A scraper including a bowl having sides each comprising spaced inner and outer plates, a bottom for the bowl including a transverse door, means hinging the door along one edge on the bowl for downward opening movement, said door when closed extending under and engaging the bottom edge of the inner plates, pulleys mounted on the plates of the two sides adjacent the top in line with the space therebetween and operating cables passing over the pulleys and depending to connection with the door in spaced relation to the hinge means.

3. A scraper including a bowl having sides each comprising spaced inner and outer plates, a bottom for the bowl including a transverse door, means hinging the door along one edge on the bowl for downward opening movement, said door when closed extending under and engaging the bottom edge of the inner plates, pulleys mounted on the plates of the two sides adjacent the top in line with the space therebetween, drums alined with the pulleys and disposed adjacent one end of the bowl, a rotary control shaft mounted on the bowl and on which said drums are fixed and cable units anchored on the drums and extending thence to and over the pulleys and depending thence between the side plates to connections with the door in spaced relation to the hinge means.

4. In a self-propelled vehicle having a frame, meshing gears mounted on the frame adjacent its forward end and means connected to one gear and operable from adjacent the rear end of the frame to rotate said gear; a scraper bowl disposed rearwardly of the gears and hung from the frame for vertical movement, a bottom discharge door on the bowl, means to control the opening and closing of the door including a rotary shaft mounted on the bowl adjacent its forward end and a flexible drive shaft connection between said rotary shaft and another one of the gears.

GORDON TITUS.